US010220704B2

(12) United States Patent
Machak et al.

(10) Patent No.: US 10,220,704 B2
(45) Date of Patent: Mar. 5, 2019

(54) METHOD AND APPARATUS FOR DOOR STATUS DETECTION

(71) Applicant: GM GLOBAL TECHNOLOGY OPERATIONS LLC, Detroit, MI (US)

(72) Inventors: Joseph Machak, Oakland Township, MI (US); Mohannad Murad, Troy, MI (US)

(*) Notice: Subject to any disclaimer, the term of this patent is extended or adjusted under 35 U.S.C. 154(b) by 156 days.

(21) Appl. No.: 15/332,576

(22) Filed: Oct. 24, 2016

(65) Prior Publication Data

US 2018/0111480 A1   Apr. 26, 2018

(51) Int. Cl.
| | |
|---|---|
| G08B 25/10 | (2006.01) |
| B60K 28/12 | (2006.01) |
| B60Q 9/00 | (2006.01) |
| B60J 5/04 | (2006.01) |
| G05B 19/048 | (2006.01) |
| G06K 9/00 | (2006.01) |

(52) U.S. Cl.
CPC ............. B60K 28/12 (2013.01); B60J 5/04 (2013.01); B60Q 9/00 (2013.01); G05B 19/048 (2013.01); G06K 9/00791 (2013.01)

(58) Field of Classification Search
CPC ............ B60K 28/12; G06K 9/00013; B60R 25/1004; B60R 25/102; B60R 25/305; B60R 25/104
USPC ....... 701/36; 180/272; 340/438, 425.5, 5.72, 340/937
See application file for complete search history.

(56) References Cited

U.S. PATENT DOCUMENTS

| | | | | |
|---|---|---|---|---|
| 8,427,291 | B2* | 4/2013 | Tanaka | B60Q 9/00 340/425.5 |
| 2005/0074142 | A1* | 4/2005 | Ertl | G06K 9/00624 382/104 |
| 2015/0360625 | A1* | 12/2015 | Randler | B60T 7/22 348/148 |
| 2017/0043783 | A1* | 2/2017 | Shaw | B60H 1/00978 |
| 2018/0105178 | A1* | 4/2018 | Khafagy | B60W 30/18054 |

* cited by examiner

*Primary Examiner* — Dalena Tran (57) ABSTRACT

A method and apparatus for detecting a status of a vehicle door are provided. The method includes detecting a status of a door based on at least one image received from a camera of a vehicle, determining a function to be performed from among a plurality of functions based on the detected status of the door, and performing the determined function. The method and apparatus may be implemented in a vehicle to display graphical indicators warning of a door being ajar or as a supplemental detection system to a hardwired door status sensor.

18 Claims, 4 Drawing Sheets

METHOD AND APPARATUS FOR DOOR STATUS DETECTION

Apparatuses and methods consistent with exemplary embodiments relate to door status detection. More particularly, apparatuses and methods consistent with exemplary embodiments relate to door status detection from camera images.

SUMMARY

One or more exemplary embodiments provide a method and an apparatus that detect a status of a door from a camera on a vehicle. More particularly, one or more exemplary embodiments provide a method and an apparatus that detect whether a door or other vehicle opening is open or closed using a side camera of a vehicle and that send a notification to a user regarding the status of the door.

According to an aspect of an exemplary embodiment, a method for detecting a status of a vehicle door is provided. The method includes detecting a status of a door based on at least one image received from a camera of a vehicle; determining a function to be performed from among a plurality of functions based on the detected status of the door; and performing the determined function.

The plurality of functions may include outputting a notification alerting of the status of door, performing a vehicle function, occupant ingress and egress detection, vehicle theft alarm control, interior lighting control, park assist control, vehicle running board up and down control, engine control, inhibiting start/stop functions of a vehicle, preparing engine for startup, adaptive cruise control, and loading an occupant profile including one or more settings from among seat position, steering wheel position, and infotainment settings.

The detecting the status of a door may include comparing the at least one image with a pre-stored baseline image of the vehicle, determining a status of an opening of a vehicle, a hatch, a trunk, a front door, a rear door, both a front door and a rear door based on the comparing of the at least one image with the pre-stored baseline image, and outputting the status.

The performing the determined function may include outputting the notification to alert of the status of the door if the status indicates at least one from among an opening of a vehicle, a hatch, a hood, a trunk, a front door, a rear door, both a front door and a rear door is open.

The detecting the status of a door may include: determining a distance between reference points in the at least one image; and determining a status of an opening of a vehicle, a hatch, a trunk, a front door, a rear door, both a front door and a rear door based on the distance between the reference points in the at least one image; and outputting the status.

The method may further include detecting whether an occupant is present in the vehicle and the performing the function may include outputting the notification by transmitting an alert to a mobile device of a user if the determining determines to output the notification alerting of the status of the door and the occupant is not present in the vehicle.

The performing the function may include outputting the notification and the outputting the notification may include displaying an indicator including a graphical illustration corresponding to the status of door.

The method may further include illuminating the door.

The at least one image received from the camera may include an image of the exterior of the vehicle.

The camera may be disposed in at least one from among a side view mirror and above the door of the vehicle.

According to an aspect of another exemplary embodiment, an apparatus for detecting a status of a vehicle door is provided. The apparatus includes at least one memory comprising computer executable instructions; and at least one processor configured to read and execute the computer executable instructions. The computer executable instructions cause the at least one processor to: detect a status of a door based on at least one image received from a camera of a vehicle; determine a function to be performed from among a plurality of functions based on the detected status of the door; and perform the determined function.

The plurality of functions may include outputting a notification alerting of the status of door, performing a vehicle function, occupant ingress and egress detection, vehicle theft alarm control, interior lighting control, park assist control, vehicle running board up and down control, engine control, inhibiting start/stop functions of a vehicle, preparing engine for startup, adaptive cruise control, and loading an occupant profile including one or more settings from among seat position, steering wheel position, and infotainment settings.

The computer executable instructions may further cause the at least one processor to detect the status of a door by comparing the at least one image with a pre-stored baseline image of the vehicle, determining a status of at least one from among an opening of a vehicle, a hatch, a trunk, a front door, a rear door, both a front door and a rear door based on the comparing of the at least one image with the pre-stored baseline image and outputting the status.

The computer executable instructions may further cause the at least one processor to perform the determined function by outputting the notification to alert of the status of the door if the status indicates at least one from among an opening of a vehicle, a hatch, a hood, a trunk, a front door, a rear door, both a front door and a rear door is open.

The computer executable instructions may further cause the at least one processor to detect the status of a door by: determining a distance between reference points in the at least one image; and determining a status of an opening of a vehicle, a hatch, a trunk, a front door, a rear door, both a front door and a rear door based on the distance between the reference points in the at least one image; and outputting the status.

The computer executable instructions may further cause the at least one processor to detect whether an occupant is present in the vehicle, and to perform the function to output the notification by transmitting an alert to a mobile device of a user if the determining determines to outputting the notification alerting of the status of the door and the occupant is not present in the vehicle.

The computer executable instructions may further cause the at least one processor to perform the function to output the notification by displaying an indicator including a graphical illustration corresponding to the status of door.

The apparatus may further include an illumination device, and the computer executable instructions may further cause the at least one processor to control the illumination device to illuminate the door.

The at least one image received from the camera may include an image of the exterior of the vehicle.

The apparatus may further include the camera disposed in at least one from among a side view mirror and above the door of the vehicle.

According to an aspect of another exemplary embodiment, a non-transitory computer readable medium comprising computer executable instructions executable by a processor to perform the method for detecting a status of a vehicle door is provided. The method includes detecting a status of an opening of a vehicle based on at least one image received from an external facing camera of a vehicle; determining whether to alert of the status of the opening based on the detected status of the opening; and outputting a notification alerting of the status of the opening if the determining determines to alert of the status of the opening.

Other objects, advantages and novel features of the exemplary embodiments will become more apparent from the following detailed description of exemplary embodiments and the accompanying drawings.

DETAILED DESCRIPTION

An apparatus and method that detect a status of a vehicle door will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles such as a passenger car, trucks, sports utility vehicles (SUVs), recreational vehicles (RVs), marine vessels, aircraft, etc., often include doors or other openings. For example, vehicles may have openings or doors including one or more of a front passenger side door, rear passenger side door, front driver side door, rear driver side door, hood, moon roof, and rear hatch or trunk. Doors may be any barrier that covers an opening of a vehicle. The barrier may be sliding or hinged. In addition, vehicles may be equipped with cameras that provide information on the vehicle and the vehicle's environment or surroundings.

Often times, a door of a vehicle is unintentionally left open or ajar. This may be detected by one or more sensors present in the vehicle or this may be detected by the cameras that provide information on the vehicle and the vehicle's environment or surroundings. In one example, one or more cameras may be used as a backup system to a hardwired switch sensor that detects door open/close.

The result of the detection of the door status may be used to perform functions. In one example, a notification may be provided to an occupant of a vehicle or to an operator or owner of a vehicle to inform that a door is ajar after an ajar door is detected by a vehicle's camera. In addition, one or more functions may be initiated and performed based on the information regarding which combination of doors, windows, trunks, and openings are open or closed that is provided by the detection sensor. The one or more functions may include vehicle theft alarm control, interior lighting control, park assist control, vehicle running board up and down control, engine control, inhibiting start/stop functions of a vehicle, preparing engine for startup, adaptive cruise control, and loading an occupant profile including one or more settings from among seat position, steering wheel position, infotainment settings, etc., from memory.

Figure 1:
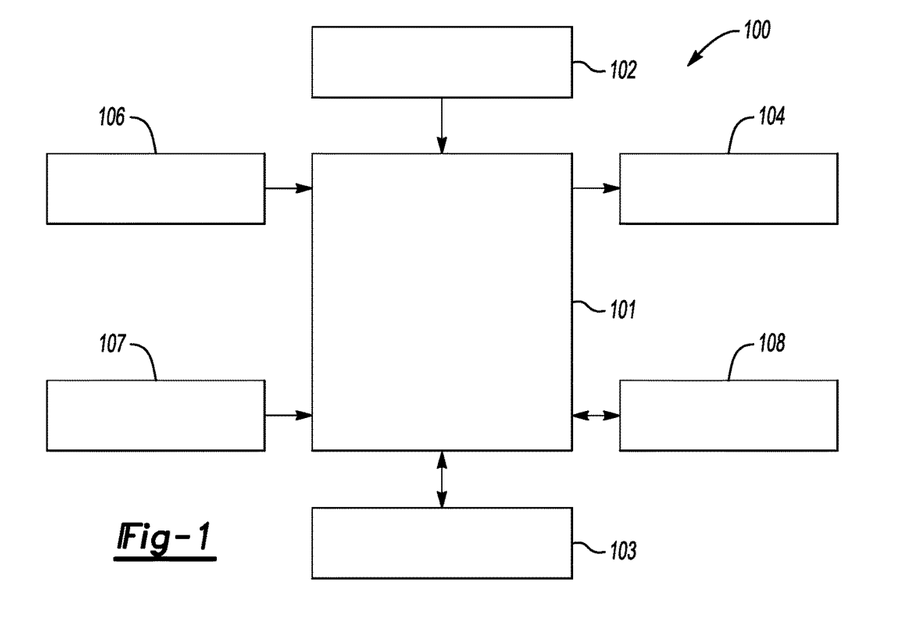
FIG. 1 shows a block diagram of an apparatus that detects a status of a vehicle door according to an exemplary embodiment.

FIG. 1 shows a block diagram of an apparatus for detecting a status of a door 100 according to an exemplary embodiment. As shown in FIG. 1, the apparatus for detecting a status of a door 100, according to an exemplary embodiment, includes a controller 101, a power supply 102, a storage 103, an output 104, a user input 106, a door status sensor 107, and a communication device 108. However, the apparatus for detecting a status of a door 100 is not limited to the aforementioned configuration and may be configured to include additional elements and/or omit one or more of the aforementioned elements. The apparatus for detecting a status of a door 100 may be implemented as part of a vehicle or as a standalone component.

The controller 101 controls the overall operation and function of the apparatus for detecting a status of a door 100. The controller 101 may control one or more of a storage 103, an output 104, a user input 106, a door status sensor 107, and a communication device 108 of the apparatus for detecting a status of a door 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the door status sensor 107, and the communication device 108 of the apparatus for detecting a status of a door 100. The information may be sent and received via a bus or network, or may be directly read or written to/from one or more of the storage 103, the output 104, the user input 106, the door status sensor 107, and the communication device 108 of the apparatus for detecting a status of a door 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the user input 106, the door status sensor 107, and the communication device 108 of the apparatus for detecting a status of a door 100. The power supply 102 may include one or more from among a battery, an outlet, a capacitor, a solar energy cell, a generator, a wind energy device, an alternator, etc.

The storage 103 is configured for storing information and retrieving information used by the apparatus for detecting a status of a door 100. The storage 103 may be controlled by the controller 101 to store and retrieve information about the status of one or more doors, windows, openings, etc. For example, the storage 103 may include information on a status of one from among a vehicle opening, a hood, a moon roof, a front passenger side door, a rear passenger side door, a front driver side door, a rear driver side door, and a rear hatch or trunk may. The status information may indicate whether one or more of the doors are closed or ajar. The storage 103 may also include the computer instructions configured to be executed by a processor to perform the functions of the apparatus for detecting a status of a door 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for detecting a status of a door 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc. In addition, the output 104 may also include a transparent display located on one or more of a windshield, a rear window, side windows, and mirrors of a vehicle.

The output 104 may output a notification including one or more from among an audible notification, a light notification, and a display notification. The notification may include information regarding the status indicating which opening or door(s) from among the moon roof, the hood, windows, the front passenger side door, rear passenger side door, front driver side door, rear driver side door, and rear hatch or trunk are ajar. The output 104 may display a graphical indicator corresponding to the status indicating which doors or openings from among windows, the hood, the moon roof, the front passenger side door, rear passenger side door, front driver side door, rear driver side door, and rear hatch or trunk are ajar.

The user input 106 is configured to provide information and commands to the apparatus for detecting a status of a door 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification.

The door status sensor 107 is configured to detect the status or position of a combination of doors, openings, windows, hoods, etc., of a vehicle. For example, the door status sensor 107 may detect a status of one or more from among an opening of a vehicle, a hood, a window, a moon roof, a front passenger side door, a rear passenger side door, a front driver side door, a rear driver side door, and a rear hatch or trunk. The door status sensor may be one primary sensor, or a combination of sensors including a primary and a secondary sensor. In one example, the primary sensor may be a hardwired door switch and the secondary or backup sensor may be a camera.

The door status sensor 107 may be one or more sensors from among a radar sensor, a microwave sensor, an ultrasonic sensor, a hardwired switch, a camera, an infrared sensor, a LIDAR, and a laser sensor. The door status sensor 107 may provide one or more from among information on the status or position of a door, information on a position of a reference mark on a door, information on a distance between a door and a reference point, and information on a difference between a reference image of a door and a current image of a door.

In addition, the door status sensor 107 may provide one or more from among information on the status or position of an opening of a vehicle, information on a position of a reference mark on an opening of a vehicle, information on a distance between an opening of a vehicle and a reference point, and information a difference between a reference image of an opening of a vehicle and a current image of an opening of a vehicle. Further, the door status sensor 107 may provide information on objects or persons entering or leaving a vehicle. The door status sensor 107 may be positioned in at least one from among a vehicle door, a vehicle dashboard, a vehicle side view mirror, a vehicle roof, a door latch area, and a vehicle hood.

The communication device 108 may be used by the apparatus for detecting a status of a door 100 to communicate with various types of external apparatuses according to various communication methods. The communication device 108 may be used to send/receive door status information to/from the controller 101 of the apparatus for detecting a status of a door 100. The communication device 108 may also be configured to transmit the notification of an ajar door and the location of an ajar door. The notification or warning may be sent by the communication device 108 to an output device or display, such as output 104 or a mobile device.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The controller 101 of the apparatus for detecting a status of a door 100 may be configured to detect a status of a door based on at least one image received from a camera of a vehicle, determine whether a function from among a plurality of functions is to be performed based on the detected status of the door, and control to perform the determined function. The plurality of functions may include one or more from among outputting a notification alerting of the status of door, vehicle theft alarm control, interior lighting control, park assist control, vehicle running board up and down control, engine control, inhibiting start/stop functions of a vehicle, preparing an engine for startup, adaptive cruise control, and loading an occupant profile including settings such as seat position, steering wheel position, infotainment settings.

The controller 101 of the apparatus for detecting a status of a door 100 may also be configured to detect the status of a door by comparing the at least one image with a pre-stored baseline image of the vehicle, determining whether an opening, a hood, a trunk, a moon roof, a window, a front door, a rear door, or both a front door and a rear door are ajar based on the comparing of the based on the comparing of the at least one image with the pre-stored baseline image, and controlling to output the status indicating at least one from among an opening, a hood, a trunk, a moon roof, a window, a front door is ajar, a rear door is ajar, both a front door and a rear door are ajar, and both a front door and a rear door are closed. The at least one image received from the camera may include an image of the exterior of the vehicle.

The controller 101 of the apparatus for detecting a status of a door 100 may also be configured to detect the status of a door by determining a distance between reference points in the at least one image; and outputting the status indicating at least one from among an opening, a hood, a trunk, a moon roof, a window, a front door, a rear door, both a front door and a rear door, and a hatch are open or closed based on the distance between reference points in the at least one image.

The controller 101 of the apparatus for detect a status of a door 100 may also be configured to detect whether an occupant is present in the vehicle, and output the notification by transmitting the alert to a mobile device of a user if the determining determines to alert of the status of the door and the occupant is not present in the vehicle.

The controller 101 of the apparatus for detect a status of a door 100 may also be configured to control an illumination device to illuminate the door.

Figure 2:
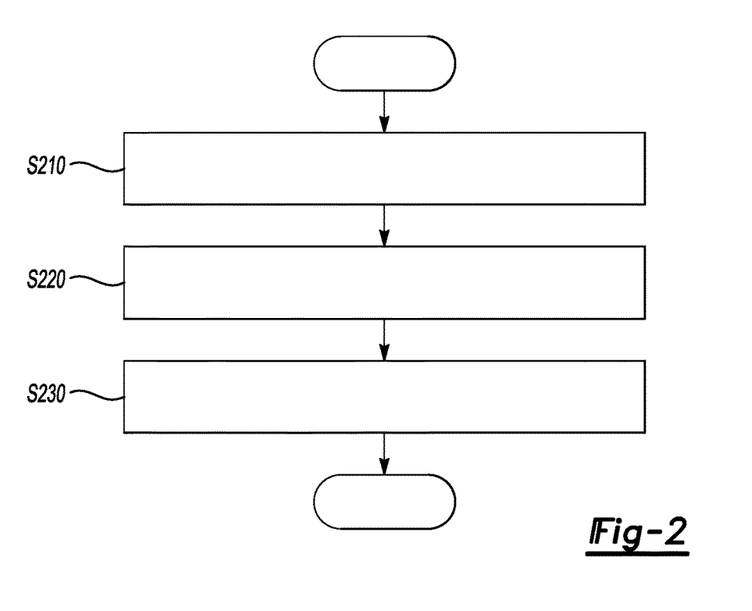
FIG. 2 shows a flowchart for a method for detecting a status of a vehicle door according to an exemplary embodiment.

FIG. 2 shows a flowchart for a method for detecting a status of a vehicle door according to an exemplary embodiment. The method of FIG. 2 may be performed by the apparatus for detecting a status of a door 100 or may be encoded into a computer readable medium as instructions that are executable by a computer to perform the method.

Referring to FIG. 2, a status of a door is detected based on at least one image received from a camera of a vehicle in operation S210. In this case, the status of one or more openings such as one or more from among a window, a moon roof, a front passenger side door, a rear passenger side door, a front driver side door, a rear driver side door, and a rear hatch or trunk may be detected by a vehicle camera such as an external facing vehicle camera.

The detecting the status of a door may include performing an image analysis by comparing the at least one image with a pre-stored baseline image of the vehicle or vehicle opening and/or determining a distance between reference points in the at least one image. The image analysis may then be used to determine whether one or more from among a window, a moon roof, a hood, a front passenger side door, a rear passenger side door, a front driver side door, a rear driver side door, and a rear hatch or trunk are and output a status indicating which doors from among the front passenger side door, rear passenger side door, front driver side door, rear driver side door, and rear hatch or trunk are ajar.

It is then determined whether a function from among a plurality of functions is to be performed based on the detected status of the door in operation S220. For example, it may be determined to alert of the status of the door when one or more from among a front passenger side door, a rear passenger side door, a front driver side door, a rear driver side door, and a rear hatch or trunk is detected to be open by a vehicle camera such as an external facing vehicle camera. Other conditions for alerting of the status of the door may also be considered by the determining whether to alert of the status of the door. The one or more conditions may include whether an occupant is present or not present in the vehicle, whether the driver, mobile device of the driver, or key of the vehicle are present in the vehicle or are moving away from the vehicle, and the state of the transmission of the vehicle.

The plurality of functions may also include one or more from among vehicle theft alarm control, interior lighting control, park assist control, vehicle running board up and down control, engine control, inhibiting start/stop functions of a vehicle, preparing engine for startup, adaptive cruise control, and loading an occupant profile including settings such as seat position, steering wheel position, infotainment settings, etc., from memory. Another example of a function that may be performed may be to detect ingress or egress of an occupant based on the detected status of the door or openings of a vehicle. For example, a sequence of door openings and closings and initiation or operation of vehicle functions and controls may be detected and analyzed to determine which seats have occupants and whether occupants are entering and leaving a vehicle.

In operation S230, the determined function is performed. For example, a notification alerting of the status of the door is output if the determining determines to alert of the status of the door. The outputting the notification may include displaying an indicator including a graphical illustration corresponding to the status of the one or more doors. Moreover, the outputting may include transmitting the alert to a mobile device of a user if the occupant is not present in the vehicle. In addition, if one or more of aforementioned conditions are met, the notification may be displayed on a display in the vehicle or may be transmitted to mobile device associated with an operator or owner of the vehicle.

Figure 3A:
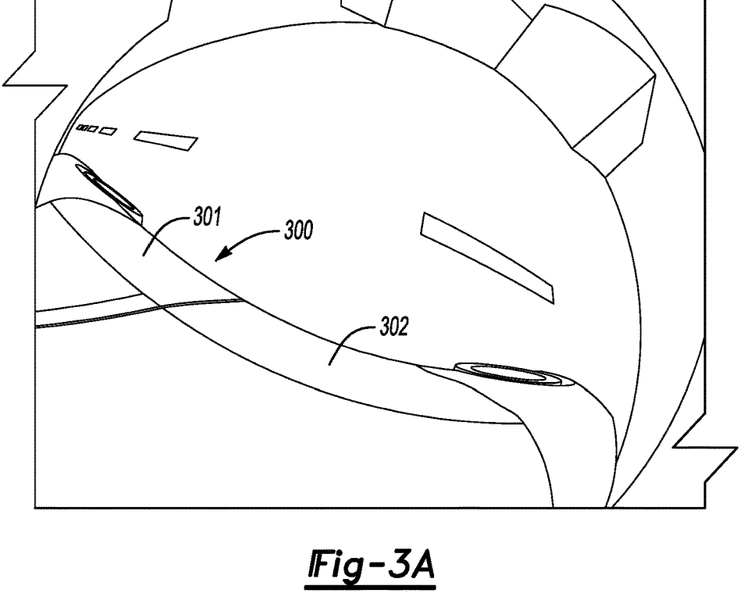
FIGS. 3A and 3B show illustrations of a side camera view of vehicle doors according to an aspect of an exemplary embodiment.
Figure 3B:
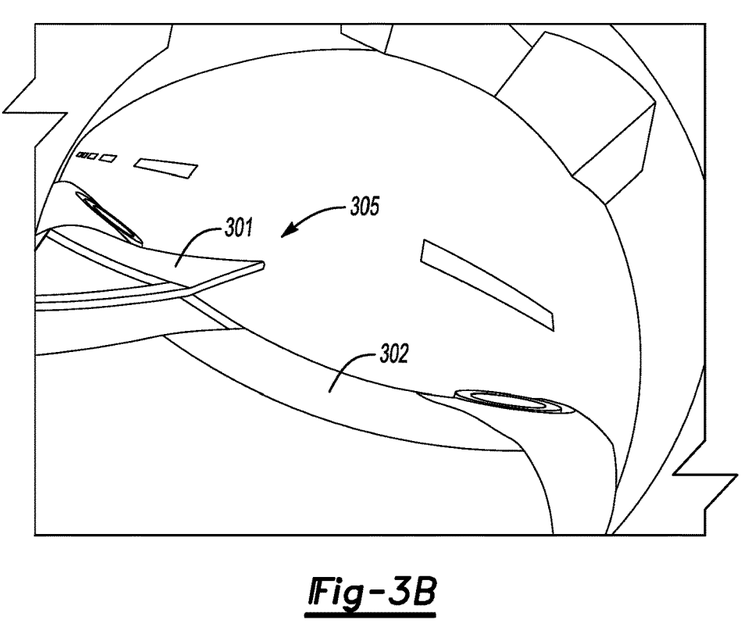

FIGS. 3A and 3B show illustrations of a side camera view of vehicle doors according to an aspect of an exemplary embodiment. Referring to FIG. 3A, a side view camera may be located near a roof or on a side view mirror on one side or both sides of a vehicle. The side view camera may capture an image 300 of the front door 301 and rear door 302 showing that the doors are closed. Referring to FIG. 3B, the side view camera may capture an images showing the movement of a door and an image 305 showing that the front door 301 is open. There may be a side view camera on each side of the vehicle to capture a view of the front passenger side door, rear passenger side door, front driver side door, and rear driver side door.

The image from the side view camera may be analyzed to determine which combination of doors, windows, and/or entrances to a vehicle are open. For example, the image from the side view camera may be analyzed to determine whether one or more from among the front passenger side door, rear passenger side door, front driver side door, and rear driver side door are open.

Figure 4A:
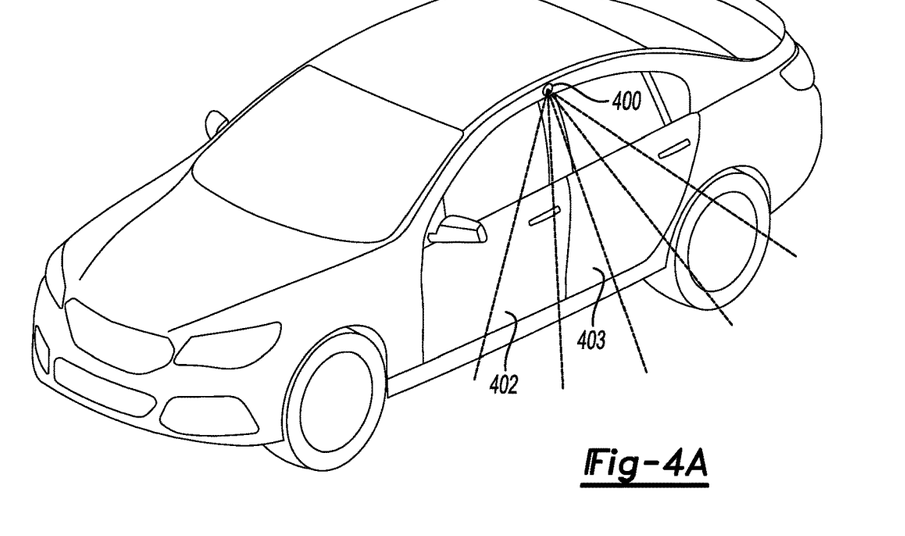
FIGS. 4A and 4B show illustrations of potential locations of cameras according to aspects of exemplary embodiments.
Figure 4B:
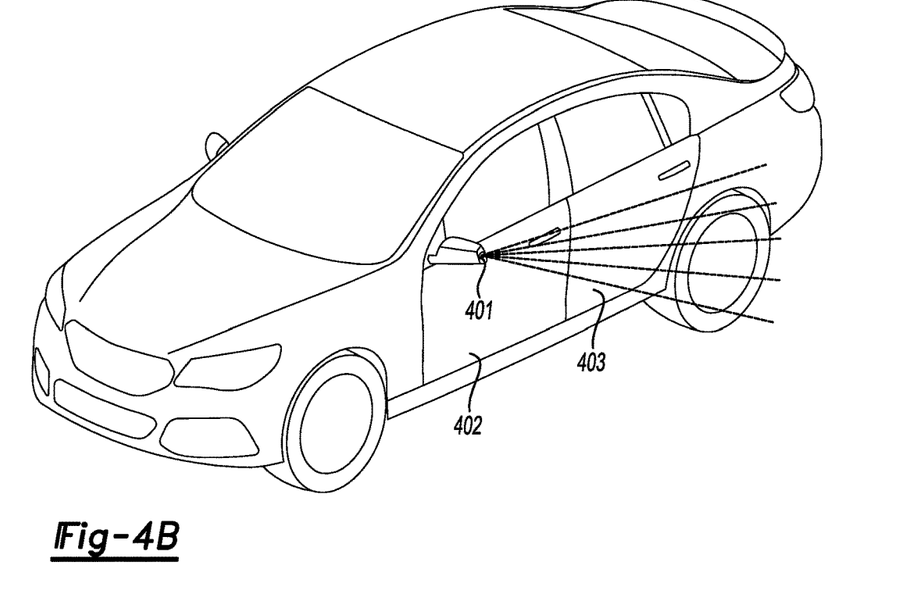

FIGS. 4A and 4B show illustrations of potential locations of cameras according to aspects of exemplary embodiments. Referring to FIG. 4A, a camera 400 positioned near the roof of the vehicle may face front door 402 and rear door 403 to capture an image of the doors. Referring to FIG. 4B, a camera 401 positioned at the side view mirror of the vehicle may face front door 402 and rear door 403 to capture an image of the doors.

Figure 5:
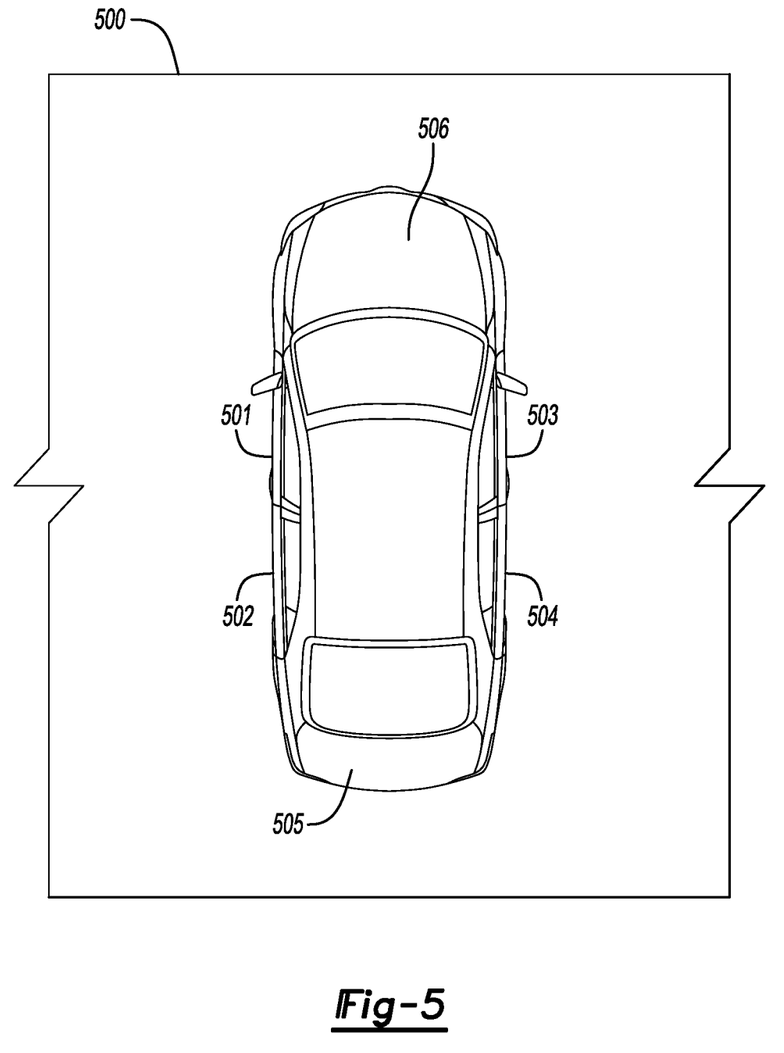
FIG. 5 shows an illustration of graphical indicators alerting of ajar doors according to an aspect of an exemplary embodiment.

FIG. 5 shows an illustration of graphical indicators alerting of ajar doors according to an aspect of an exemplary embodiment. Referring to FIG. 5, a graphical indicator 500 shows graphical indicators corresponding to the front driver side door 501, rear driver side door 502, front passenger side door 503, rear passenger side door 504, rear trunk or hatch 505, and/or hood 506 that is ajar. The graphical indicators may be presented on a display located in a vehicle or presented on a display of mobile device to notify an owner or operator of a vehicle that one or more doors are ajar. The graphical indicators may light up or be highlighted to show an ajar door, trunk, hook, window, moon roof, etc.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting a status of a vehicle door, the method comprising:
    detecting a status of a door based on at least one image received from a camera of a vehicle;
    determining a function to be performed from among a plurality of functions based on the detected status of the door; and
    performing the determined function,
    wherein the plurality of functions comprise outputting a notification alerting of the status of door, performing a vehicle function, occupant ingress and egress detection, vehicle theft alarm control, interior lighting control, park assist control, vehicle running board up and down control, engine control, inhibiting start/stop functions of a vehicle, preparing engine for startup, adaptive cruise control, and loading an occupant profile including one or more settings from among seat position, steering wheel position, and infotainment settings,
    wherein the detecting the status of a door comprises:
        determining a distance between reference points in the at least one image;
        determining a status of an opening of a vehicle, a hatch, a trunk, a front door, a rear door, or both a front door and a rear door based on the distance between the reference points in the at least one image; and
        outputting the status.

2. The method of claim 1, wherein the detecting the status of a door comprises:
    comparing the at least one image with a pre-stored baseline image of the vehicle;
    determining the status of the at least one from among the opening of the vehicle, the hatch, the trunk, the front door, the rear door, both the front door and the rear door based on the comparing of the at least one image with the pre-stored baseline image; and
    outputting the status.

3. The method of claim 2, wherein the performing the determined function comprises outputting the notification to alert of the status of the door if the status indicates the at least one from among the opening of the vehicle, the hatch, the trunk, the front door, the rear door, both the front door and the rear door is open.

4. The method of claim 1, further comprising:
    detecting whether an occupant is present in the vehicle,
    wherein the performing the function comprises outputting the notification by transmitting an alert to a mobile device of a user if the determining determines to output the notification alerting of the status of the door and the occupant is not present in the vehicle.

5. The method of claim 1, wherein the performing the function comprises outputting the notification, and
    wherein the outputting the notification comprises displaying an indicator including a graphical illustration corresponding to the status of door.

6. The method of claim 1, further comprising illuminating the door.

7. The method of claim 1, wherein the at least one image received from the camera includes an image of the exterior of the vehicle.

8. The method of claim 1, wherein the camera is disposed in at least one from among a side view mirror and above the door of the vehicle.

9. A non-transitory computer readable medium comprising computer executable instructions executable by a processor to perform the method of claim 1.

10. An apparatus for detecting a status of a door, the apparatus comprising:
    at least one memory comprising computer executable instructions; and
    at least one processor configured to read and execute the computer executable instructions, the computer executable instructions causing the at least one processor to:
        detect a status of a door based on at least one image received from a camera of a vehicle;

determine a function to be performed from among a plurality of functions based on the detected status of the door; and perform the determined function, wherein the plurality of functions comprise outputting a notification alerting of the status of door, performing a vehicle function, occupant ingress and egress detection, vehicle theft alarm control, interior lighting control, park assist control, vehicle running board up and down control, engine control, inhibiting start/stop functions of a vehicle, preparing engine for startup, adaptive cruise control, and loading an occupant profile including one or more settings from among seat position, steering wheel position, and infotainment settings, wherein the computer executable instructions further cause the at feast one processor to detect the status of a door by:
   determining a distance between reference points in the at least one image;
   determining a status of an opening of a vehicle, a hatch, a trunk, a front door, a rear door, or both a front door and a rear door based on the distance between the reference points in the at least one image; and
   outputting the status.

11. The apparatus of claim 10, wherein the computer executable instructions further causing the at least one processor to detect the status of a door by:
   comparing the at least one image with a pre-stored baseline image of the vehicle;
   determining the status of the at least one from among the opening of the vehicle, the hatch, the trunk, the front door, the rear door, both the front door and the rear door based on the comparing of the at least one image with the pre-stored baseline image; and
   outputting the status.

12. The apparatus of claim 11, wherein the computer executable instructions further cause the at least one processor to perform the determined function by outputting the notification to alert of the status of the door if the status indicates the at least one from among the opening of the vehicle, the hatch, the trunk, the front door, the rear door, both the front door and the rear door is open.

13. The apparatus of claim 10, wherein the computer executable instructions further cause the at least one processor to detect whether an occupant is present in the vehicle, and wherein the computer executable instructions further cause the at least one processor to perform the function to output the notification by transmitting an alert to a mobile device of a user if the determining determines to outputting the notification alerting of the status of the door and the occupant is not present in the vehicle.

14. The apparatus of claim 10, wherein the computer executable instructions further cause the at least one processor to perform the function to output the notification, and
   wherein the function to output the notification comprises displaying an indicator including a graphical illustration corresponding to the status of door.

15. The apparatus of claim 10, further comprising an illumination device,
   wherein the computer executable instructions further cause the at least one processor to control the illumination device to illuminate the door.

16. The apparatus of claim 10, wherein the at least one image received from the camera includes an image of the exterior of the vehicle.

17. The apparatus of claim 10, further comprising the camera disposed in at least one from among a side view mirror and above the door of the vehicle.

18. A non-transitory computer readable medium comprising computer executable instructions executable by a processor to perform a method for detecting a status of a vehicle door, the method comprising:
   detecting a status of an opening of a vehicle based on at least one image received from an external facing camera of a vehicle;
   determining whether to alert of the status of the opening based on the detected status of the opening; and
   outputting a notification alerting of the status of the opening if the determining determines to alert of the status of the opening,
   wherein the detecting the status of a door comprises:
      determining a distance between reference points in the at least one image;
      determining a status of an opening of a vehicle, a hatch, a trunk, a front door, a rear door, or both a front door and a rear door based on the distance between the reference points in the at least one image; and
   outputting the status.

\* \* \* \* \*